United States Patent
Kaneko et al.

(10) Patent No.: US 8,208,424 B2
(45) Date of Patent: Jun. 26, 2012

(54) WIRELESS BASE STATION FOR COMMUNICATIONS NETWORK

(75) Inventors: Shoji Kaneko, Fujimino (JP); Shinichi Nomoto, Fujimino (JP); Kazunori Takeuchi, Fujimino (JP)

(73) Assignee: KDDI R&D Laboratories Inc., Saitama-ken (JP)

( * ) Notice: Subject to any disclaimer, the term of this patent is extended or adjusted under 35 U.S.C. 154(b) by 1057 days.

(21) Appl. No.: 12/133,044

(22) Filed: Jun. 4, 2008

(65) Prior Publication Data

US 2008/0304442 A1 Dec. 11, 2008

(30) Foreign Application Priority Data

Jun. 5, 2007 (JP) ................................ 2007-149284

(51) Int. Cl.
- *H04W 4/00* (2009.01)
- *H03H 7/30* (2006.01)
- *H03H 7/40* (2006.01)
- *H03K 5/159* (2006.01)
- *H04B 7/10* (2006.01)
- *H04L 1/02* (2006.01)

(52) U.S. Cl. ......... 370/328; 370/332; 375/232; 375/347
(58) Field of Classification Search .................. None
See application file for complete search history.

(56) References Cited

U.S. PATENT DOCUMENTS

| | | | | |
|---|---|---|---|---|
| 5,987,011 A | * | 11/1999 | Toh | 370/331 |
| 6,128,501 A | * | 10/2000 | Ffoulkes-Jones | 455/456.3 |
| 7,376,125 B1 | * | 5/2008 | Hussain et al. | 370/352 |
| 2004/0082311 A1 | * | 4/2004 | Shiu et al. | 455/403 |
| 2005/0222771 A1 | * | 10/2005 | Matsumoto | 702/3 |
| 2008/0233992 A1 | * | 9/2008 | Oteri et al. | 455/522 |

FOREIGN PATENT DOCUMENTS

WO  WO 2004/109536  12/2004

* cited by examiner

*Primary Examiner* — Ian N Moore
*Assistant Examiner* — Eric H Wang
(74) *Attorney, Agent, or Firm* — Morgan, Lewis & Bockius LLP

(57) ABSTRACT

A wireless base station includes: a trend factor regression expression calculator for determining, on the basis of measured wireless communication environment factor, the trend of the variation in the environment factor; a trend prediction value calculator for calculating, on the basis of the determined trend of the variation in the environment factor, the environment prediction value; an irregular variation factor calculator for calculating, on the basis of the difference between the determined trend of the environment factor variation and the measured environment factor, the magnitude of correction to be applied to the environment prediction value; and a radio environment prediction correction unit for correcting the environment prediction value according to the tolerance of the base station for its communication failure risk.

5 Claims, 5 Drawing Sheets

FIG. 4

| EMERGENCY CALL | | MULTICAST /UNICAST | | CURRENT TRAFFIC LOAD | | NODE STATE |
|---|---|---|---|---|---|---|
| Yes | ∧ | * | ∧ | * | → | RISK-AVOIDING |
| No | ∧ | UNICAST | ∧ | LIGHT | → | RISK-PREFERNECE |
| No | ∧ | UNICAST | ∧ | HEAVY | → | RISK-NEUTRAL |
| No | ∧ | MULTICAST | ∧ | LIGHT | → | RISK-PREFERNECE |
| No | ∧ | MULTICAST | ∧ | HEAVY | → | RISK-PREFERNECE |

WIRELESS BASE STATION FOR COMMUNICATIONS NETWORK

INCORPORATION BY REFERENCE

Priority is claimed on Japanese Patent Application No. 2007-149284 filed Jun. 5, 2007, the content of which is incorporated herein by reference.

BACKGROUND OF THE INVENTION

1. Field of Invention

The present invention relates to a wireless base station for communications network, the base station having a plurality of wireless communication media each providing a communication area.

2. Description of Related Art

In recent years, a variety of wireless communication systems have come to be in broad use, with the users demanding increasingly greater variety of data communications and higher transmission rate. Under the circumstances, there is a greater demand for higher spectral efficiency in wireless communication systems. One of the known wireless communication systems with improved spectral efficiency is cognitive radio communication system. A cognitive radio communication system is adapted to recognize radio environment of the wireless communication station to perform communications through optimal wireless communication media and optimal channel. A cognitive radio communication system is capable of enhancing spectral efficiency through the selection of optimal media (frequency) on the basis of the recognition of the quality of radio environment. A cognitive radio communication system can be used, for example, as a temporary back-up system network in extraordinary emergency such as a great earthquake and tsunami. More specifically, when ordinary communication systems have been knocked out of service due to such serious disaster, a mobile base station adapted to cognitive radio communication can be brought in to quickly provide a wireless communication system to secure communication network. As stated above, a wireless base station for cognitive radio communication is adapted to recognize radio environment surrounding it and establish self-controlled communication link with optimal wireless media to the recognized environment. Thus, a wireless base station for cognitive radio communication can be quickly set up upon suffering disaster, without any need for advance study on the location of such base station.

Since a cognitive radio base station selects wireless media on the basis of the quality of radio environment, such environment should preferably be predicted as of a future point in time where the wireless media is actually used. As a conventional technique of predicting the radio environment, PCT International Publication No. WO 2004/109536 A1 is cited. In the approach adopted in the PCT Publication, the prediction is based on signal strength, signal-to-noise ratio or any statistic collected at physical layer, which is deemed representative of link quality. In addition, the predicted value is adjusted on the basis of the traffic conditions (e.g., idle, light traffic, moderate or heavy traffic) being experienced by the node whose link qualities are being estimated.

However, the above-mentioned conventional method for predicting the radio environment involves the problem such that neither prediction error nor importance of message is taken into account and consequently that it is difficult for the base station to select wireless media suited thereto with prediction error and/or importance of message taken into account.

With a view toward resolving the above problem, the present invention is aimed at providing a wireless base station, which is capable of selecting wireless communication media suited optimally for the current state thereof and for the current state of radio environment, by providing correction to the predicted value on the basis of the importance of message and traffic load being experienced by the base station while achieving improvement in spectral efficiency.

SUMMARY OF THE INVENTION

According to the present invention, there is provided a wireless base station having a plurality of wireless communication media each for providing a certain communication area, comprising: a measuring unit which measures, for each of the communication media, radio environment factor representative of the quality of radio environment; an environment predicting unit which predicts, for each of the communication media, the environment on the basis of the measured environment factor; and a selecting unit which selects a communication media for communication on the basis of the output of the environment predicting unit; wherein the environment predicting unit comprises: an environment factor prediction value determining unit which monitors the trend in which the measured environment factor varies so as to determine a value representative of the environment factor prediction value; a correction magnitude calculating unit which calculates, on the basis of the difference between the determined trend of the environment factor variation and the measured environment factor, the magnitude of correction to be applied to the environment factor prediction value; and an environment factor prediction value correcting unit which corrects the radio environment factor prediction value according to the tolerance for the base station's failure risk for communication.

In the wireless base station of the present invention, the radio environment predicting unit may be of the regression expression-based type capable of providing data representative of the trend in which the radio environment factor varies.

In the wireless base station of the present invention, the correction magnitude calculating unit may be featured by calculating, on the basis of the difference between the regression expression-based calculation and the measured environment factor, a statistic of variation which cannot be described by the regression expression-based calculation.

In the wireless base station of the present invention, the tolerance for the base station's failure risk may be classified into risk-avoiding, risk-neutral and risk-preference ones in nature.

In the wireless base station of the present invention, the tolerance for the base station's failure risk may be defined on the basis of one or more of the spectral efficiency, the message importance and the traffic load handled by the base station.

The environment factor prediction value correcting unit in the base station of the present invention performs the correction of the environment factor toward a value representative of deteriorated environment if the tolerance for the base station's failure risk is the risk-avoiding one; and toward a value representative of improved environment if the tolerance is the risk-preference one. If the tolerance is the risk-neutral one, there is no correction.

According to the present invention, the error of the predicted environment factor measured by the base station can be corrected on the basis of the importance of message and the traffic load handled by the base station, while the spectral efficiency is improved. This brings about advantageous effects such that a base station can select a communication media suited not only for the actual environment but for its own requirements.

BRIEF DESCRIPTION OF THE DRAWINGS

FIG. 4 shows an example of criteria for node states in the embodiment.

DETAILED DESCRIPTION OF THE INVENTION

Figure 1:
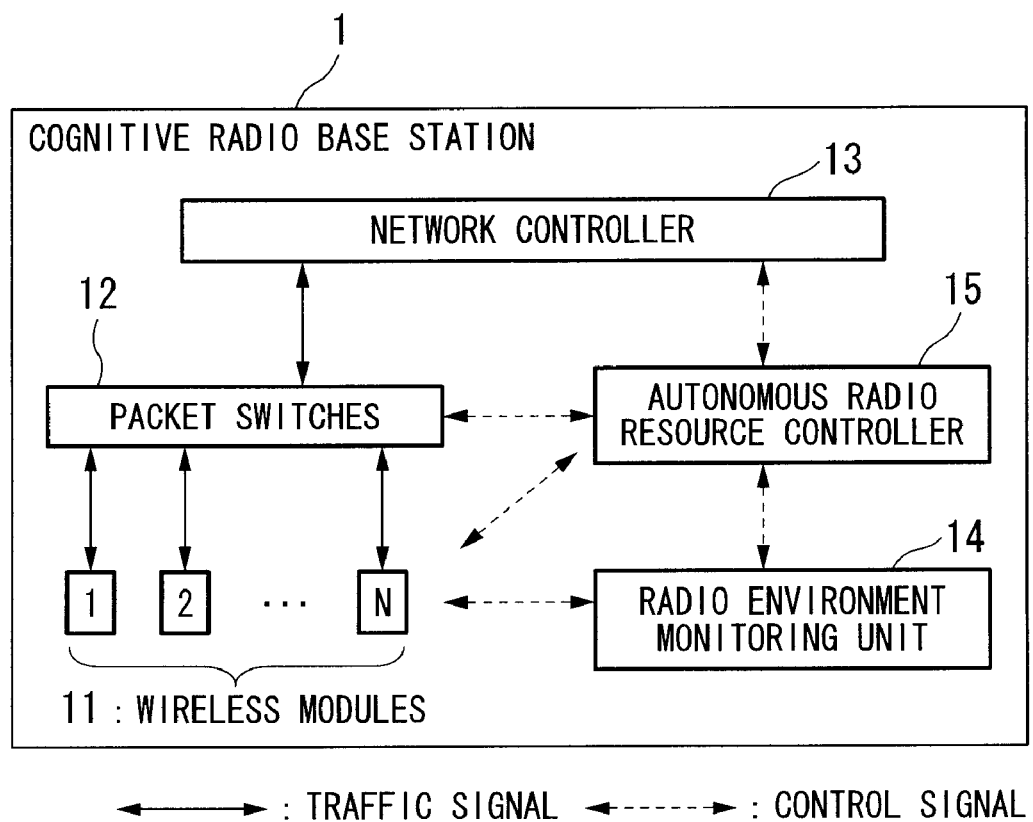
FIG. 1 shows in blocks a cognitive radio base station, which is an embodiment of the present invention.

The invention will now be described in conjunction with a cognitive radio base station, which embodies the invention. A cognitive radio base station has a plurality of communication media, each of which provides a communication area. A cognitive radio base station is adapted to recognize the quality of the radio environment surrounding the station, to select on the basis of the recognized environment an optimal one out of the plurality of communication media, for wireless communication through the selected communication media. Alternatively, the cognitive radio base station may be adapted to select an optimal radio frequency channel within the optimal transmission media for wireless communication therethrough on the basis of the recognized environment. The wireless communication station with which the cognitive radio base station is in communication may be another cognitive radio base station or a simpler wireless communication terminal equipment. In the following description, the "destination station" with which the cognitive radio base station is in communication means a mobile cognitive radio station or a wireless terminal equipment.

The communication media includes a wireless LAN system and a mobile communication system. The wireless LAN system may be based on IEEE Standard 802.11j, IEEE Standard 802.11b and IEEE Standard 802.11g. The mobile communication system may include the "Mobile Wi MAX" wireless access system based on IEEE Standard 802.16e and the "cdma2000 1x EV-DO" system.

The cognitive radio base station of this embodiment will now be described in greater detail referring to the drawings.

FIG. 1 shows in blocks the makeup of cognitive radio base station 1 of this embodiment. Referring to FIG. 1, cognitive radio base station 1 has a plurality of (n in number) wireless modules 11, packet switches 12, network controller 13, radio environment monitoring unit 14, and autonomous radio resource controller 15.

Each of the wireless modules 11 corresponds to a specific wireless communication media. Each of the wireless modules 11 provides a communication area of the wireless media to which it corresponds. A communication area is an area within which the destination station can communicate through the wireless media. If the destination station is in the communication area of a certain wireless module 11, that destination station can communicate with that wireless module 11 through the wireless media corresponding thereto.

A wireless module 11 has a physical (PHY) layer corresponding to the wireless media of its own, while functioning as a data link layer. Wireless modules 11 are connected to packet switches 12 for transmission/reception of data packets. On the other hand, wireless modules are linked with wireless modules of the corresponding wireless media in the destination station. Wireless modules 11 are adapted to transmit data packets received from packet switches 12, while they are adapted to forward data packets received through wireless channels to packet switches 12.

Moreover, wireless modules 11 are adapted to measure, for each of the wireless channels, the radio environment factor representative of the quality of the radio environment. The radio environment factor includes the reception power, interference power, the number of retransmissions of data packets, the number of CRC (cyclic redundancy check) error packets, and the length of time during which certain wireless channels have been occupied. When the length of time during which a wireless channel is occupied is used as the radio environment factor, the difference between such length of time and the time expended for its own communication may be utilized as the factor as well.

A dedicated wireless module for the measurement of the radio environment factor may be provided, separately from wireless modules 11 for communication use.

Packet switches 12 are adapted to perform switching for data packets. Packet switches 12 are connected to network controller 13 for exchange of data packets therewith. Packet switches 12 provide as their respective outputs data packets received from network controller 13 to those wireless modules 11 which have been designated by autonomous radio resource controller 15. On the other hand, packet switches 12 rearrange the order of data packets received from wireless modules 11, thereby to output the order-rearranged data packets to network controller 13.

Network controller 13 serves as a network layer for the base station to provide routing for the data packets. Network controller 13 provides to autonomous radio resource controller 15 addresses to which the routed data packets are caused to hop next.

Radio environment monitoring unit 14 receives from each of the wireless modules 11 a radio environment factor. Based on the environment factors, the monitoring unit 14 performs the prediction of radio environment. More specifically, the monitoring unit 14 recognizes the quality of the radio environment on the basis of the environment prediction results. In other words, it decides which one of the plurality of wireless media is in a favorable state for use. Also, it decides which one of the RF channels of which wireless media is in favorable state for use.

Autonomous radio resource controller 15 is adapted to control packet switches 12. More specifically, controller 15 decides, for each of the data packets, which one of the wireless modules 11 should be used, and provides instructions to packet switches 12 accordingly.

The autonomous radio resource controller 15 receives the results of the radio environment information from the monitoring unit 14 and decides, based on the monitoring results, which one of those wireless modules should be used which have established connection with the destination station. Alternatively, the controller 15 may decide, based on the monitoring results, which one of the RF channels of one of those wireless modules should be used which have established connection with the destination station. In the latter case, where the RF channels are to be designated, the controller 15 gives instruction to one of the wireless modules 11, under which one of the RF channels is designated. Under this state, a destination station can be designated on the basis of the address received through network controller 13.

Figure 2:
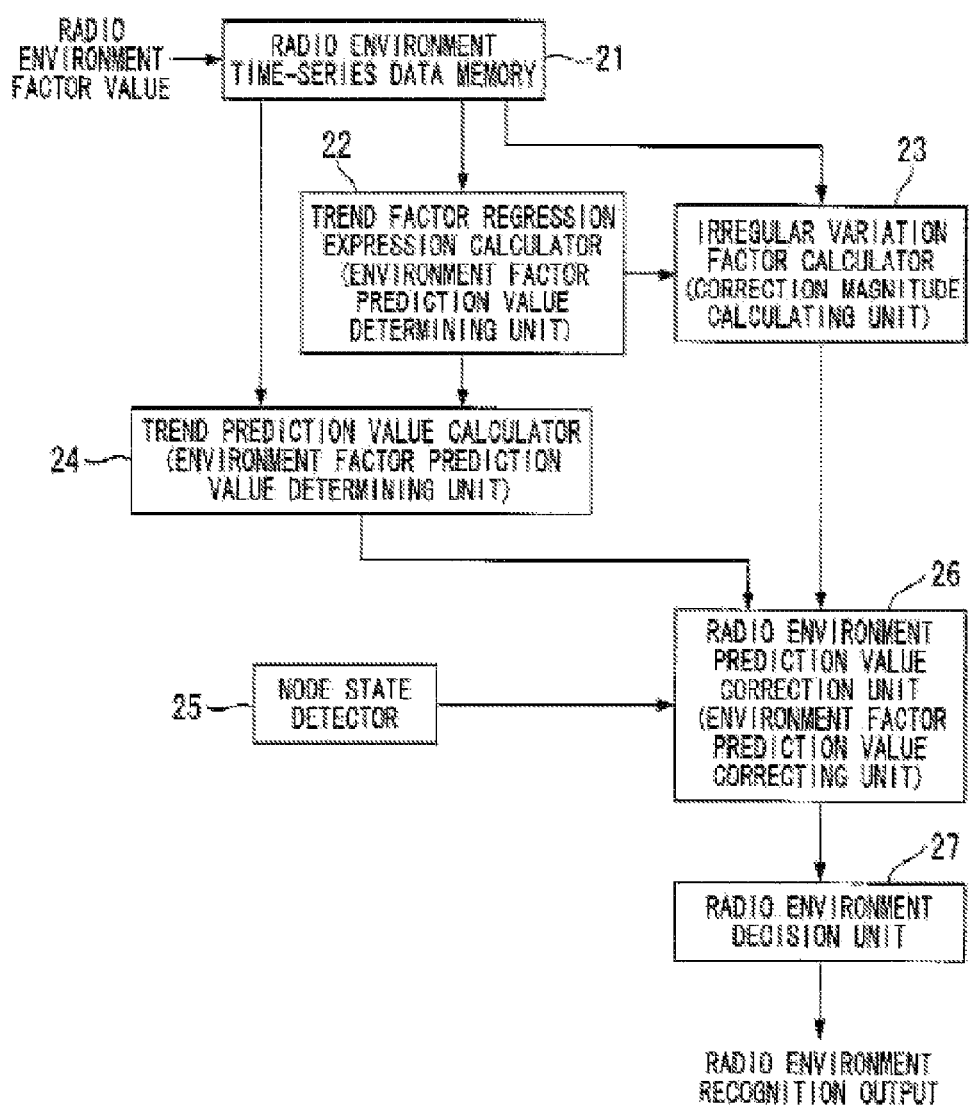
FIG. 2 shows in blocks the makeup of radio environment monitoring unit 14 employed in the base station shown in FIG. 1.

FIG. 2 shows in blocks the makeup of the radio environment monitoring unit 14. Referring to FIG. 2, the monitoring unit 14 has time-series environment data memory 21, trend factor regression expression calculator 22, irregular variation factor calculator 23, trend prediction value calculator 24, node state detector 25, environment prediction value correction circuit 26, and radio environment decision unit 27.

Time-series environment data memory 21 stores, for each of the wireless modules 11, the environment data received therefrom, as a time-series data (wireless communication environment time-series data). Trend factor regression expression calculator 22 determines, for each of the wireless modules 11, trend factor regression expression from the wireless communication environment time-series data. The trend factor regression expression is a regression expression which defines the trend of the radio environment. Irregular variation factor calculator 23 calculates, for each of the wireless modules 11, irregular variation factor on the basis of the difference between the calculation output obtained from the trend factor regression expression and the radio environment time-series data stored in memory 21. The irregular variation factor represents a statistic of the variations which cannot be described by the trend factor regression expression.

Trend prediction value calculator 24 calculates, for each of the wireless modules 11, a prediction value of the radio environment factor (trend prediction value) using the trend factor regression expression. Node state detector 25 decides on the tolerance for the node's communication failure risk (node state). Environment prediction value correction unit 26 corrects, for each of the wireless modules 11, the trend prediction values on the basis of the irregular variation factor, thereby to calculate radio environment prediction value. Also, the correction circuit 26 decides on how the trend prediction value should be corrected depending on the node state. The radio environment prediction value is provided for each of the wireless modules 11.

Radio environment decision unit 27 decides on the future radio communication environment on the basis of the prediction value to provide the radio environment recognition output. For example, one of the wireless modules 11 which exhibits a prediction value greater than a threshold value is decided to be a wireless module favorable for use. In addition, the wireless modules 11 can be ranked in terms of the magnitude of the prediction value. The results of the decision on the prediction values are supplied to controller 15 as the radio environment recognition output. Controller 15 selects one of the modules on the basis of the radio environment recognition output.

Figure 3:
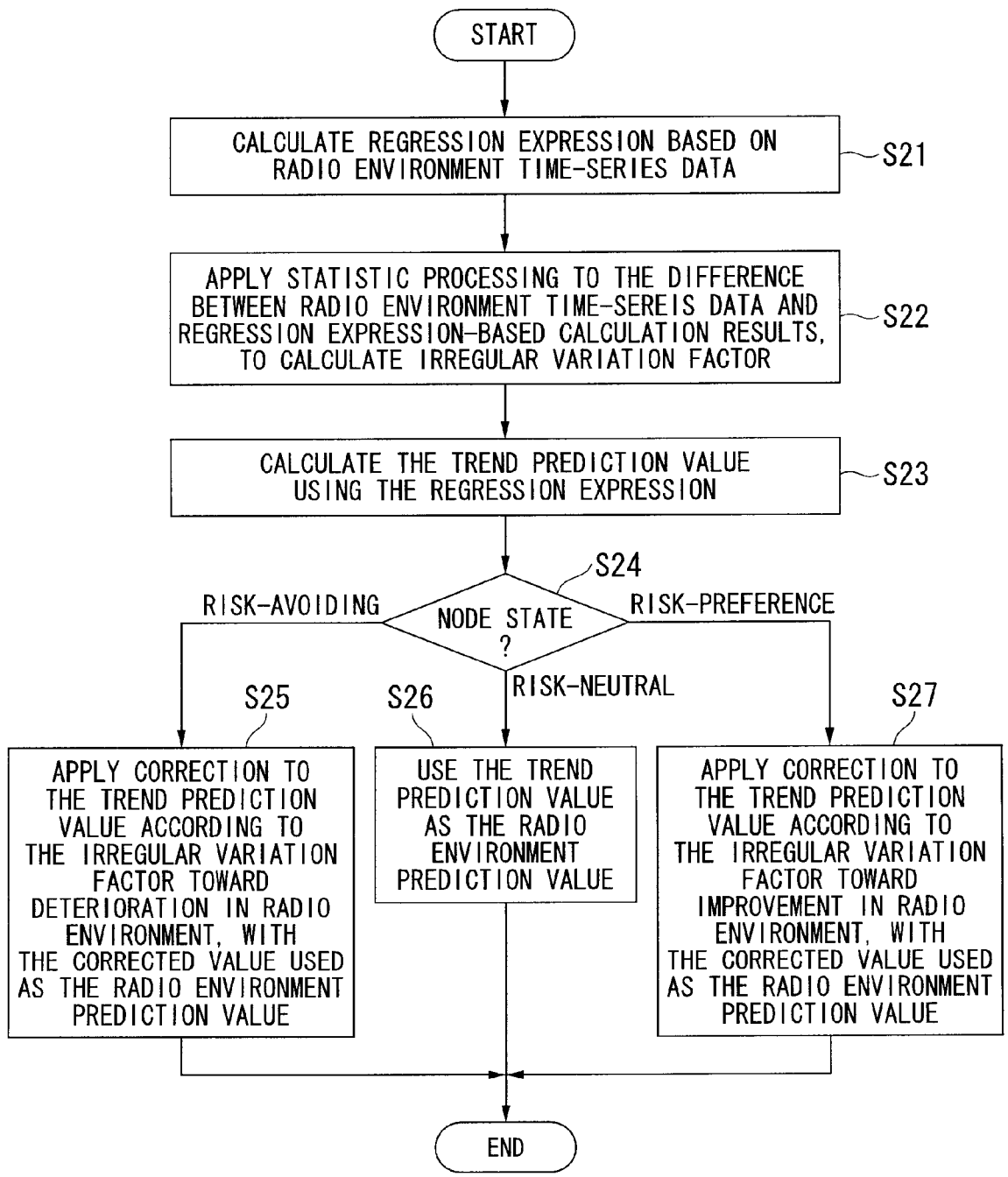
FIG. 3 shows a flowchart illustrating the procedure for determining the radio environment factor prediction value in the embodiment of the present invention.

Turning to FIG. 3, which shows a flow chart of the process of calculating the radio environment prediction value in the above embodiment, the method of calculating such prediction value will now be described. The process of calculating a prediction value in conjunction with one of the wireless modules 11 (wireless media) will be described, although the calculation is actually performed for each of the wireless modules 11 (wireless media).

Referring to FIG. 3, the trend factor regression expression is determined at step S21 on the basis of the radio environment time-series data stored in memory 21. The trend factor regression expression can be calculated by applying an appropriate time-series model such as auto-regressive (AR) model. The trend factor regression expression based on the AR model is as follows:

$$X'_{t+1} = a_0 X_t + a_1 X_{t-1} + \ldots + a_p X_{t-p} + b$$

where $X'_{t+1}$ is a radio environment prediction value at time t+1; $X_t$ is a radio environment factor value at time t; and $a_0$, $a_1, \ldots, a_p$ and b are coefficients for the regression expression. It will be noted here that p is a parameter determined in advance for the use by the regression expression.

At step S22 of FIG. 3, the trend prediction values are calculated by the trend factor regression expression for the period of time during which the radio environment prediction values have already been measured, to permit the value to be compared with the radio environment time-series data stored in memory 21 to provide the difference therebetween, thereby to calculate the irregular variation factor on the basis of the above difference. The calculation of the irregular variation factor can be based, for example, on cumulative distribution or probability distribution such as Gaussian distribution. The probability distribution used for calculation of irregular variation factor values is referred to as irregular variation factor distribution.

For calculation of the irregular variation factor, the difference between the calculated value by the trend factor regression expression and the radio environment time-series data is calculated first, for the period of time during which the radio environment has been measured. The difference value is then used to achieve the cumulative distribution or to apply to probability distribution. An irregular variation factor is then determined from the irregular variation factor distribution, using an irregular variation factor reference value, which sets the condition for specifying the irregular variation factor out of an irregular variation factor distribution.

For example, if the cumulative distribution is used with the irregular variation factor reference value set at 95%, the difference in the cumulative distribution graph for the change from 0% to 2.5% of the cumulative and that for the change from 100% to 97.5% are used as irregular variation factor values. The same applies to the situation where probability distribution is used.

At step S23, the trend prediction value up to the point in time, where the next wireless module selection is performed, is calculated using the trend factor regression expression.

At step S24, the node state indicative of the node's tolerance for the communication failure risk is estimated. An example of criteria for the node state is shown in FIG. 4, in which three different types of node states are judged on the basis of three different judgment items.

The first item is directed to the distinction of whether the call being handled is an emergency call or not. The second item is for the distinction between multicast communication and unicast communication. The third item is for the analysis of whether the amount of data being handled at its own node is higher or lower than the criteria.

The first node state is the "risk-avoiding" state, where communication failure risk is avoided to the extent possible, thereby to ensure the reliability. Under this state, the spectral efficiency cannot be improved very much.

The second node state is the "risk-neutral" state, where there is no particular requirement concerning communication failure risk.

The third node state is the "risk-preference" state, where the spectral efficiency should preferably be improved even at the risk of communication failure.

Referring to FIG. 4, which shows criteria for the node state, the node state is estimated to be "risk-avoiding" regardless of other estimation items, if the call being handled is an emergency call. This is because an emergency call is of highest importance, that gives greater priority to communication reliability than improvement in spectral efficiency.

If the call being handled by the node is found to be of unicast communication, with the current traffic at the node being lower than a reference value, the node state is judged to be "risk-preference." When the traffic load being handled by the node is low, the retransmission of data packets of unicast communication does not result in significant increase in the amount of data to be handled. Since the communication failure risk is limited under this state, "risk-preference" is selected, thereby to improve spectral efficiency. On the other hand, when the current traffic load being handled by the node is higher than a reference value, the node state is judged to be "risk-neutral."

When the call being handled by the node is of multicast, the node state is judged to be "risk-preference," regardless of the traffic load being handled by the node. Since multicast communication typically requires immediate handling with no retransmission, the length of time during which the wireless channel is occupied by the retransmission and the increase in the traffic resulting from the retransmission need not be considered. Since the risk for communication failure is low, the "risk-preference" state is selected to further improve the spectral efficiency. In the case of multicast communication, the "risk-neutral" state may be selected for improved communication reliability if the current traffic load is low, or the "risk-avoiding" state may be selected if the current traffic load is high. This is because no retransmission is performed.

The criteria for the node state judgment can be arbitrarily set on the basis of the operation policy for the wireless communication system.

The processing proceeds to step S25 if the node state is "risk-avoiding," while it proceeds to step S26 if the node state is "risk-neutral," and to step S27 if the node state is "risk-preference."

At step S25, the radio environment prediction value is calculated for the node state being "risk-avoiding." Similarly, if the node state is "risk-avoiding," the trend prediction value for the next wireless module selection timing as calculated at step S23 is corrected toward deteriorated radio environment by the irregular variation factor value calculated at step S22 above. The corrected value is then used as the radio environment prediction value, which sets a stricter condition for the selection of wireless module 11.

At step S26, the radio environment prediction value is calculated for the node state being "risk-neutral." When the node state is "risk-neutral," the trend prediction value calculated at step S23 for the time point for the selection of the next wireless module is used as the radio environment prediction value as it is.

At step S27, the radio environment prediction value is calculated for the node state being "risk-preference." When the node state is "risk-preference," the trend prediction value for the next wireless module selection timing as calculated at step S23 is corrected toward improved radio environment by the irregular variation factor value calculated at step S22 above. The corrected value is then used as the radio environment prediction value, which sets a more relaxed condition for the selection of wireless module 11.

Figure 5:
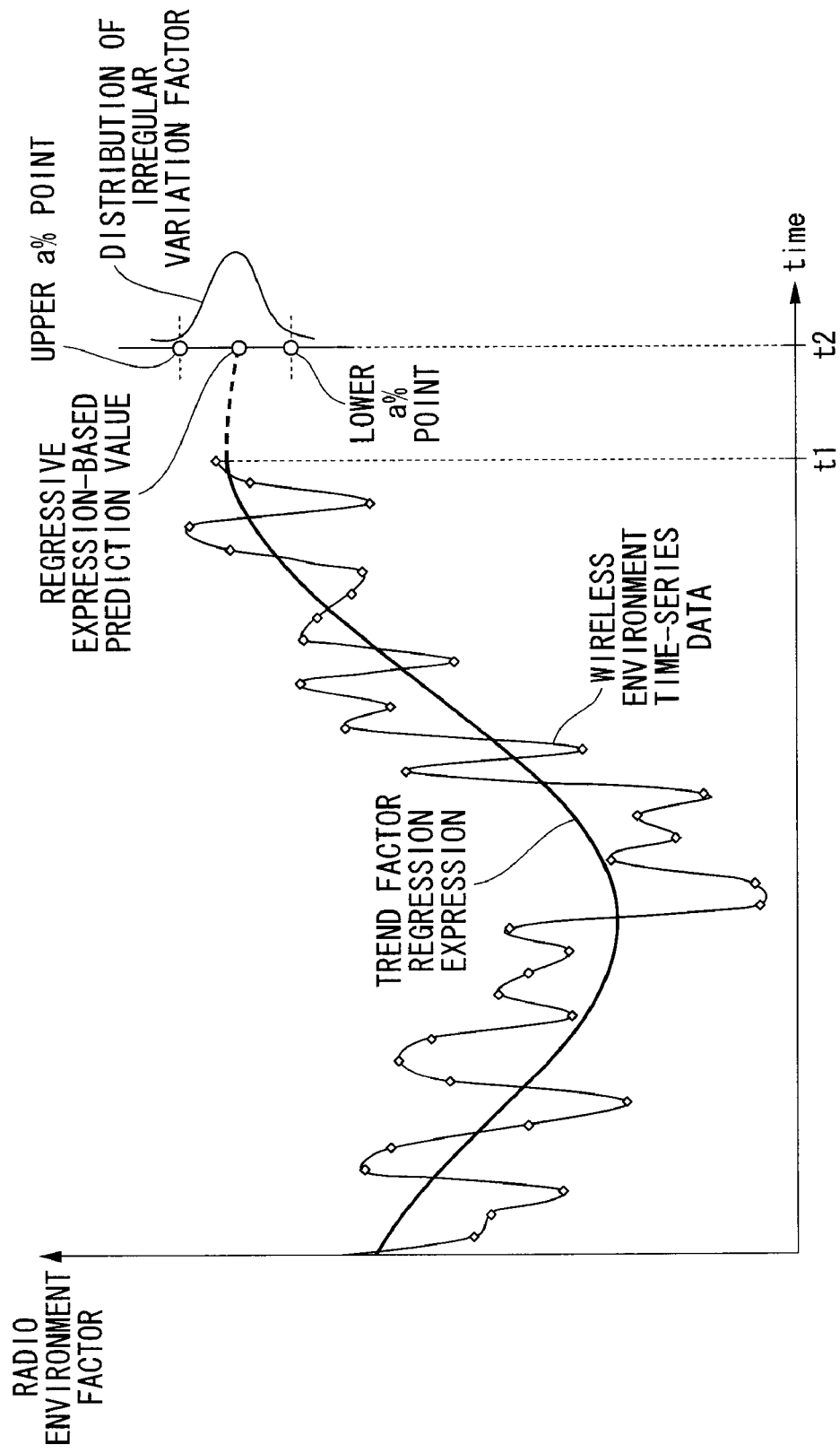
FIG. 5 shows a general illustration for describing the correction of the trend prediction value performed in the embodiment.

FIG. 5 shows a general illustration for describing the correction of the trend prediction value performed in the above embodiment. In the example shown in FIG. 5, it is assumed that Gaussian distribution is used as the irregular variation factor distribution. Referring to FIG. 5, the trend factor regression expression is calculated at time t1 from the radio environment time-series data already measured and stored. Based on the trend factor regression expression, the trend prediction value is sequentially calculated up to time t2, where the next wireless module is selected. On the other hand, Gaussian distribution is applied to the irregular variation factor distribution for the difference between the calculated values by trend factor regression expression and the radio environment time-series data. Then, the upper difference value (at the upper a % point) and the lower difference value (at the lower a % point) are determined. Thus, the trend prediction value for the next wireless module selection time t2 is corrected by the corresponding value for the upper or lower a % point, thereby to provide the radio environment prediction value for the next wireless module selection time t2. Alternatively, the trend prediction value without undergoing correction is used, as it is, as the radio environment prediction value for the next wireless module selection time t2. Referring further to FIG. 5, it is assumed, for example, that the radio environment factor is represented by the time in which the wireless channel is occupied. In this situation, the greater the factor value, the more deteriorated is the radio environment and, conversely, the smaller the factor value, the more improved is the radio environment. Accordingly, if the node state is "risk-avoiding," the trend prediction value is corrected toward the radio environment deterioration by applying the value at the upper a % of the irregular variation factor distribution (Gaussian distribution), thereby to use the corrected value as the radio environment prediction value. More definitely, the value corresponding to the upper a % point with the trend prediction value for the next wireless module selection time t2 set at the center (average) of the irregular variation factor distribution (Gaussian distribution) is used as the radio environment prediction value.

When the node state is "risk-neutral," the prediction value for the next wireless module selection time t2 is used, as it is, as the radio environment prediction value.

When the node state is "risk-preference," the value corresponding to the lower a % point of irregular variation factor distribution (Gaussian distribution) is used for the correction toward the radio environment improvement of the trend prediction value, thereby to use the corrected value as the radio environment prediction value. More specifically, the value corresponding to the lower a % point with the trend prediction value for the next wireless module selection time t2 set at the center (average) of the irregular variation factor distribution (Gaussian distribution) is used as the radio environment prediction value.

In the Gaussian distribution, the peak of the distribution curve (peak, center of the curve) corresponds to the average. The distance from the average to the upper a % point (|average−value at the upper a % point|) and the distance from the average to the lower a % point (|average−value at the lower a % point|) are used for the correction.

In the above embodiment, the trend prediction value can be corrected by using any statistic (irregular variation factor), which cannot be described by the trend factor regression expression and, at the same time, decision can be made on how the correction to the trend prediction value should be performed depending on the node's tolerance for the communication failure risk (toward radio environment deterioration, or improvement, or no correction). This makes it possible to obtain the radio environment prediction value suited for the state of the node itself. Thus, due to the selection of the wireless module (wireless media) for communication based on the radio environment prediction value, the selection of wireless module (wireless media) suited not only for the actual radio environment but also for the situation of the base station itself is realized.

In the embodiment described above, when the node state of its own is "risk-avoiding," the radio environment prediction value prompting the selection of a wireless module (wireless media) can be obtained, which ensures communication reliability without achieving the improvement in spectral efficiency by correcting the trend prediction value toward deteriorated radio environment. When the node state is "risk-preference," on the other hand, a radio environment prediction value to prompt the selection of a wireless module (wireless media) which improves the spectral efficiency can be obtained, by correcting the trend prediction value toward improved radio environment. This brings about advantageous effect such that a wireless module (wireless media) suited not only for the radio environment but also for the needs of its own can be selected.

It will be noted that the irregular variation factor reference value to be applied to the irregular variation factor distribution can be arbitrarily selected on the basis of the operation policy for the wireless communication system. The irregular variation factor reference value to be used for the correction toward deteriorated radio environment and the other irregular variation factor reference value to be used for the correction toward improved radio environment can be provided separately from each other. For example, the irregular variation factor reference value used for the correction toward the improved radio environment can be set at a value higher than the irregular variation factor reference value used for the correction toward deteriorated radio environment.

In the selection of the wireless modules, a decision can be made on whether or not the radio environment prediction value should be used, depending on the node state.

While preferred embodiments of the invention have been described and illustrated above, it should be understood that these are exemplary of the invention and are not to be considered as limiting. Additions, omissions, substitutions and other modifications can be made without departing from the spirit or scope of the present invention. For example, the wireless base station of the invention may be made of a mobile unit, or a fixed unit not adapted to transportation.

What is claimed is:

1. A wireless base station having a plurality of wireless communication media each for providing a certain communication area, comprising:
　a measuring unit which measures, for each of the wireless communication media, radio environment factor representative of the quality of radio environment;
　an environment predicting unit which predicts, for each of the communication media, said radio environment on the basis of the measured environment factor; and
　a selecting unit which selects a communication media for communication on the basis of the output of the environment predicting unit; wherein the environment predicting unit comprises:
　an environment factor prediction value determining unit which monitors the trend in which said measured environment factor varies so as to determine an environment factor prediction value;
　a correction magnitude calculating unit which calculates, on the basis of the difference between the determined trend of the environment factor variation and the measured environment factor, the magnitude of correction to be applied to the environment factor prediction value; and
　an environment factor prediction value correcting unit which corrects the environment factor prediction value according to the tolerance for the base station's failure risk for communication,
　wherein the environment factor prediction value determining unit is of the regression expression-based type capable of providing data representative of the trend in which the radio environment factor varies, and
　wherein the correction magnitude calculating unit calculates, on the basis of the difference between the regression expression-based calculation output and the measured environment factor, a statistic of variation which cannot be described by the regression expression-based calculation.

2. A wireless base station as set forth in claim 1 wherein the tolerance for the base station's failure risk is classified into risk-avoiding, risk-neutral and risk-preference ones in nature.

3. A wireless base station as set forth in claim 1 wherein the tolerance for the base station's failure risk is defined on the basis of one or more of the spectral efficiency, the message importance and the traffic load handled by the base station.

4. A wireless base station as set forth in claim 2, wherein the environment factor prediction value correcting unit performs the correction of the environment factor toward a value representative of deteriorated environment if the tolerance for the base station's failure risk is the risk-avoiding one, and toward a value representative of improved environment if the tolerance is the risk-preference; and performs no correction if the tolerance is the risk-neutral one.

5. A wireless base station having a plurality of wireless communication media each for providing a certain communication area, comprising:
　a measuring unit which measures, for each of the wireless communication media, radio environment factor representative of the quality of radio environment;
　an environment predicting unit which predicts, for each of the communication media, said radio environment on the basis of the measured environment factor; and
　a selecting unit which selects a communication media for communication on the basis of the output of the environment predicting unit; wherein the environment predicting unit comprises:
　an environment factor prediction value determining unit which monitors the trend in which said measured environment factor varies so as to determine an environment factor prediction value;
　a correction magnitude calculating unit which calculates, on the basis of the difference between the determined trend of the environment factor variation and the measured environment factor, the magnitude of correction to be applied to the environment factor prediction value; and
　an environment factor prediction value correcting unit which corrects the environment factor prediction value according to the tolerance for the base station's failure risk for communication,
　wherein the tolerance for the base station's failure risk is classified into risk-avoiding, risk-neutral and risk-preference ones in nature, and
　wherein the environment factor prediction value correcting unit performs the correction of the environment factor toward a value representative of deteriorated environment if the tolerance for the base station's failure risk is the risk-avoiding one, and toward a value representative of improved environment if the tolerance is the risk-preference; and performs no correction if the tolerance is the risk-neutral one.

* * * * *